United States Patent
Halepatali et al.

(10) Patent No.: US 11,120,382 B2
(45) Date of Patent: Sep. 14, 2021

(54) SYSTEM AND METHOD FOR WORKSITE MANAGEMENT

(71) Applicant: Caterpillar Inc., Peoria, IL (US)

(72) Inventors: Praveen Halepatali, Savoy, IL (US); Vamsi Kalyan Putta, Champaign, IL (US); Vijay Krishna Yalamanchili, Savoy, IL (US)

(73) Assignee: Caterpillar Inc., Peoria, IL (US)

(*) Notice: Subject to any disclaimer, the term of this patent is extended or adjusted under 35 U.S.C. 154(b) by 923 days.

(21) Appl. No.: 15/086,107

(22) Filed: Mar. 31, 2016

(65) Prior Publication Data
US 2017/0286886 A1    Oct. 5, 2017

(51) Int. Cl.
| | |
|---|---|
| *G06Q 10/00* | (2012.01) |
| *G06Q 10/06* | (2012.01) |
| *G08G 1/00* | (2006.01) |
| *G07C 5/02* | (2006.01) |
| *B60W 60/00* | (2020.01) |
| *G06Q 50/30* | (2012.01) |

(52) U.S. Cl.
CPC ... *G06Q 10/06398* (2013.01); *B60W 60/0025* (2020.02); *G06Q 50/30* (2013.01); *G07C 5/02* (2013.01); *G08G 1/202* (2013.01); *G08G 1/207* (2013.01)

(58) Field of Classification Search
None
See application file for complete search history.

(56) References Cited

U.S. PATENT DOCUMENTS

| | | | |
|---|---|---|---|
| 7,945,364 B2 | 5/2011 | Schricker et al. | |
| 8,412,421 B2 | 4/2013 | Greiner et al. | |
| 8,437,924 B2 | 5/2013 | Greiner et al. | |
| 2009/0096637 A1 | 4/2009 | Olsen et al. | |
| 2011/0148856 A1* | 6/2011 | Sprock | E02F 9/2054 345/419 |
| 2011/0153214 A1* | 6/2011 | Sprock | G06T 17/00 702/5 |
| 2011/0288908 A1* | 11/2011 | Greiner | E02F 9/265 705/7.38 |
| 2012/0136508 A1* | 5/2012 | Taylor | G05D 1/0274 701/2 |

(Continued)

FOREIGN PATENT DOCUMENTS

CN    104579104    4/2015

OTHER PUBLICATIONS

Katrakazas, Christos, Real-Time motion planning, Nov. 2015, ScienceDirect, https://www.sciencedirect.com/science/article/pii/S0968090X15003447, p. 1-63.*

*Primary Examiner* — Joseph M Waesco
(74) *Attorney, Agent, or Firm* — Xsensus LLC

(57) ABSTRACT

A method of managing a worksite is provided. The method includes tracking a position of a machine travelling on the worksite. The method includes segmenting a route of the machine on the worksite into at least two topographic segments based on the tracked position of the machine. The method includes receiving at least one operational parameter of the machine along the route. Further, the method includes generating a feedback based, at least in part, on the at least one operational parameter and the segmented route.

19 Claims, 6 Drawing Sheets

(56) References Cited

U.S. PATENT DOCUMENTS

| | | | |
|---|---|---|---|
| 2013/0311153 A1* | 11/2013 | Moughler | E02F 9/205 703/6 |
| 2014/0163773 A1* | 6/2014 | Braunstein | E02F 9/205 701/2 |
| 2014/0163779 A1* | 6/2014 | Braunstein | E02F 9/2054 701/2 |
| 2014/0163805 A1* | 6/2014 | Braunstein | E02F 9/265 701/23 |
| 2015/0153736 A1* | 6/2015 | Braunstein | G05D 1/0276 701/23 |
| 2015/0154247 A1* | 6/2015 | Reid | G06Q 10/06313 701/23 |
| 2015/0198736 A1* | 7/2015 | Clar | G01C 21/20 702/5 |
| 2015/0269685 A1 | 9/2015 | Takeda | |
| 2016/0001781 A1* | 1/2016 | Fung | B60K 28/02 701/36 |
| 2016/0163222 A1* | 6/2016 | Sprock | G09B 19/24 434/219 |
| 2016/0170089 A1* | 6/2016 | Collins | G01C 15/00 702/5 |
| 2016/0179062 A1* | 6/2016 | Marchione | G07C 5/008 700/85 |
| 2016/0257310 A1* | 9/2016 | Sprock | B60W 40/08 |
| 2016/0292846 A1* | 10/2016 | Sprock | G06T 7/001 |
| 2016/0292920 A1* | 10/2016 | Sprock | G06T 13/20 |
| 2018/0329418 A1* | 11/2018 | Baalke | G05D 1/0246 |
| 2019/0276034 A1* | 9/2019 | Fung | B60R 25/25 |

* cited by examiner

SYSTEM AND METHOD FOR WORKSITE MANAGEMENT

TECHNICAL FIELD

The present disclosure relates to a worksite management system. More particularly, the present disclosure relates to a system and a method associated with route data analytics for a plurality of machines operating on a worksite.

BACKGROUND

Work environments associated with certain industries, such as the mining and construction industries, are susceptible to change. These changing characteristics of the work environment may have an impact on operator and machine performance, thereby affecting cost and productivity of the system. For example, in case of haul routes, the characteristics such as grade, curvature and super elevation may change over multiple machine cycles.

However, since the work environment may undergo changes due to several factors including, machine operation, weather conditions, and so on it may be difficult for data related to these changes to be effectively collected and analyzed a priori. Such systems may be complex and costly to implement. Further, in these situations, the operator of the machine may be unware of the changes in the work environment causing the operator to operate or continue to operate the machine in a particular way. Sometimes, the machine may have a chance of getting damaged due to unexpected changes in the topography of the worksite or the manner in which the operator is operating the machine. As a result, the operator may not optimally control an operation of the machine.

U.S. Published Application Number 2009/0096637 describes a distributed mine management system. The distributed mine management system contains a central computer having a first database controlled by a first controller. At least one mobile computer is in communication with a piece of mobile equipment. Each of the mobile computers has a second database controlled by a second controller. The mobile computers store high, medium and low priority data about the status of the mobile equipment in the second database according to the priority of the information. The mine management system includes a remote worksite computer and an intermittent communication path between the remote worksite computer and the central computer. A wireless communication network enables communication between the first controller and the second controller, wherein said mobile computer is operable independent of the first logic unit.

SUMMARY OF THE DISCLOSURE

In one aspect of the present disclosure, a method of managing a worksite is provided. The method includes tracking a position of a machine travelling on the worksite. The method includes segmenting a route of the machine on the worksite into at least two topographic segments based on the tracked position of the machine. The method includes receiving at least one operational parameter of the machine along the route. Further, the method includes generating a feedback based, at least in part, on the at least one operational parameter and the segmented route.

In another aspect of the present disclosure, a data system for managing a worksite is provided. The data system includes a position sensor located on-board a machine travelling on the worksite. The data system also includes a parameter sensor located on-board the machine. The parameter sensor is configured to provide a signal indicative of a plurality of operational parameters of the machine. Further, the data system includes a processing device communicably coupled to the position sensor and the parameter sensor. The processing device is configured to track a position of a machine travelling on the worksite. The processing device is configured to segment a route of the machine on the worksite into at least two topographic segments based on the tracked position of the machine. The processing device is configured to receive at least one operational parameter of the machine along the route. Further, the processing device is configured to generate a feedback based, at least in part, on the at least one operational parameter and the segmented route.

In yet another aspect of the present disclosure, a computer program product is provided. The computer program product is embodied in a computer readable medium. The computer program product is useable with a programmable processing device to a worksite management system. The computer program product is configured to execute a set of instructions for tracking a position of a machine travelling on the worksite. The computer program product is configured to execute a set of instructions for segmenting a route of the machine on the worksite into at least two topographic segments based on the tracked position of the machine. Further, the computer program product is configured to execute a set of instructions for receiving at least one operational parameter of the machine along the route. The computer program product is configured to execute a set of instructions for generating a feedback based, at least in part, on the at least one operational parameter and the segmented route.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
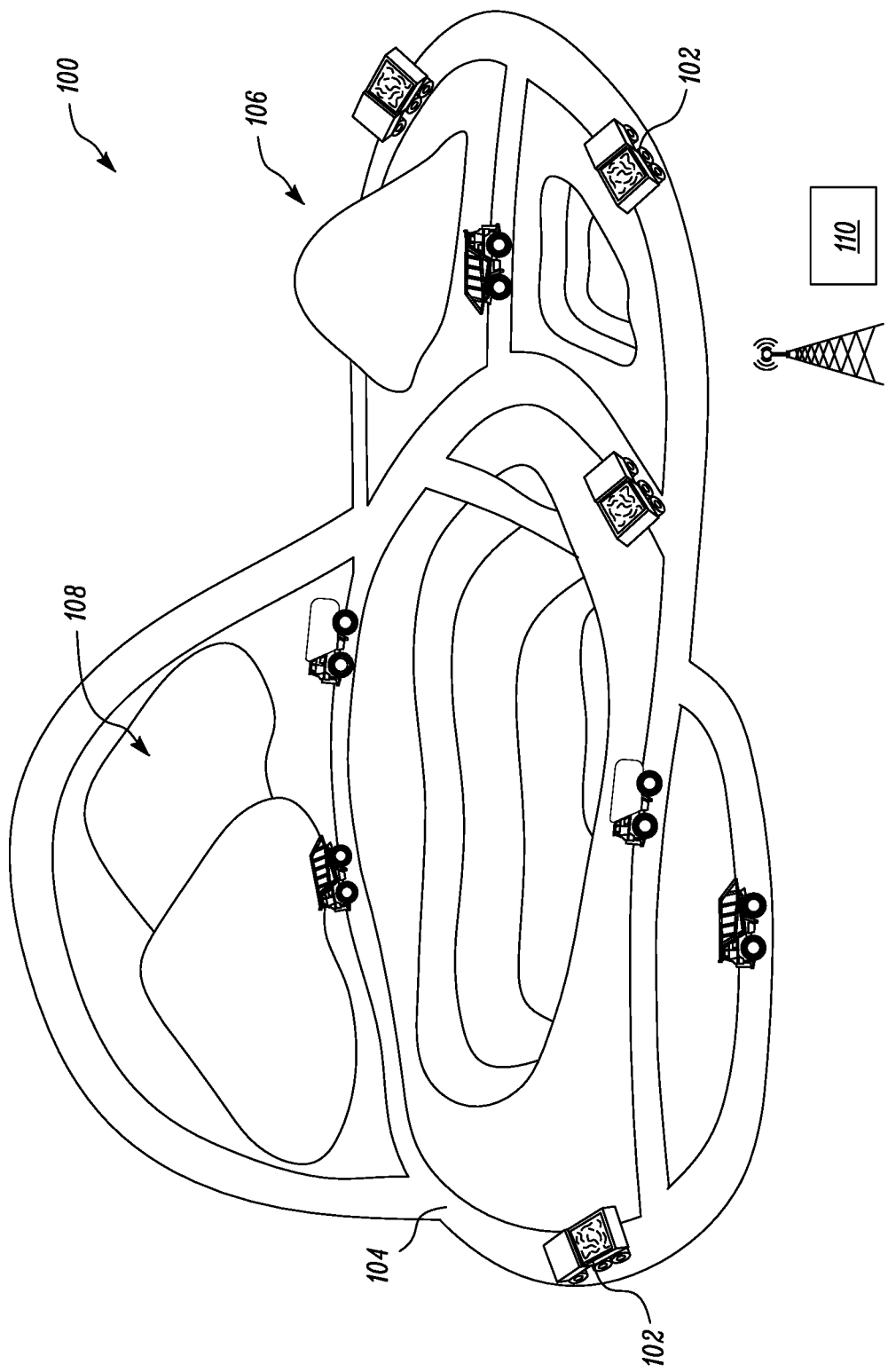
FIG. 1 is a schematic view of an exemplary worksite having a plurality of machines, according to one embodiment of the present disclosure.

FIG. 1 illustrates an exemplary worksite 100. In one embodiment, the worksite 100 may embody a surface mine site. Alternatively, the worksite 100 may embody a construction site, a landfill, an underground mine site, or any other worksite without any limitations. Referring to FIG. 1, a number of machines 102 operate on the worksite 100. The machines 102 may include any combination of autonomous (e.g., unmanned) machines, semi-autonomous machines, and operator-controlled machines.

The machines 102 employed at the worksite 100 may be of different types. For example, the machines 102 may include, digging machines, loading machines, hauling machines, transport machines, and other types of machines known in the art. The digging machine refers to any machine that reduces material at the worksite 100 for the purpose of subsequent operations, for example, for blasting, loading, and hauling operations. Examples of the digging machines may include excavators, backhoes, dozers, drilling machines, trenchers, drag lines, etc. Based on the requirements, a number of the digging machines may be co-located within a common area at the worksite 100 and may perform similar functions. The loading machine refers to any machine that lifts, carries, and/or loads material that has been reduced by the digging machine onto the waiting hauling machines. Examples of the loading machine may include a wheeled or tracked loader, a front shovel, an excavator, a cable shovel, a stack reclaimer, or any other similar machine. One or more of the loading machines may operate within common areas of the worksite 100 to load reduced materials onto the hauling machines.

The hauling machine refers to any machine that carries the excavated materials between different locations within the worksite 100. Examples of the hauling machine may include an articulated truck, an off-highway truck, an on-highway dump truck, a wheel tractor scraper, or any other similar machine. After loading of payload, the hauling machines transport the payload from areas of excavation within the worksite 100, along pre-determined routes 104 such as, haul routes or other paths between loading areas 106, dumping areas 108, and other destinations on the worksite 100. In other embodiments, the machines 102 may also perform a number of other operations, such as cutting, digging, scraping, excavating, and so on at various locations on the worksite 100.

The machines 102 at the worksite 100 are in wireless communication with a worksite control facility 110, such that information may be transmitted to and received from the worksite control facility 110. For example, information related to various operational parameters associated with the machine 102 such as, speed, direction of traversal, a gear setting, and so on may be transmitted to the worksite control facility 110. In another example, information related to the route 104 that the machine 102 needs to follow, location of the loading and dumping areas 106, 108 on the worksite 100, and so on may be received by the machine 102 from the worksite control facility 110. Accordingly, various sensors and/or controllers on the machine 102 may communicate with the worksite control facility 110 over suitable communication networks associated with the worksite 100.

For example, the communication network may include a satellite communication system. Alternatively and/or additionally, the communication network may include one or more broadband communication platforms appropriate for communicatively coupling the machines 102 to the worksite control facility 110 such as, for example, cellular, Bluetooth, microwave, point-to-point wireless, point-to-multipoint wireless, multipoint-to-multipoint wireless, or any other appropriate communication platform for networking a number of components.

Figure 2:
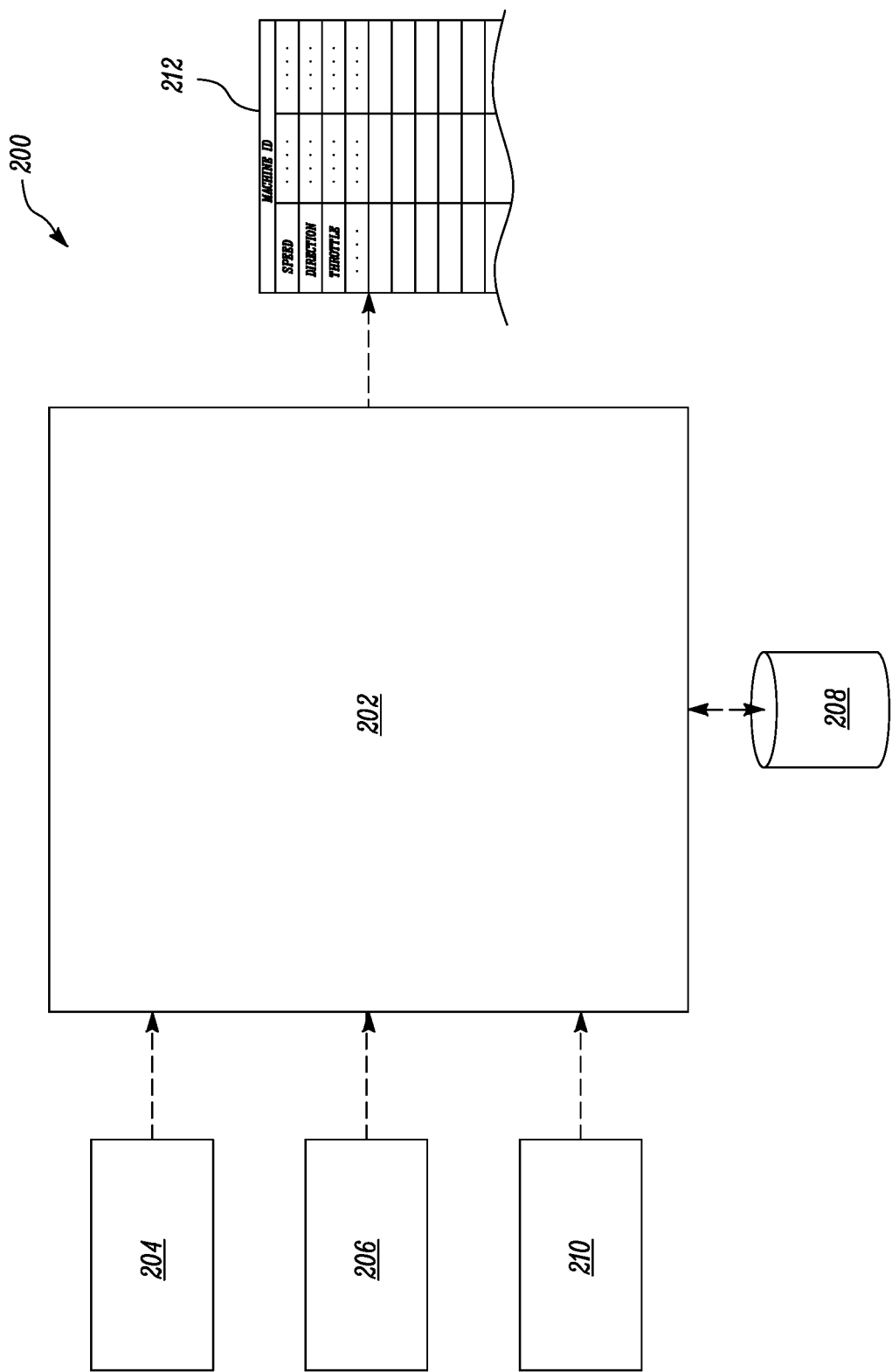
FIG. 2 is a block diagram of a worksite management system, according to one embodiment of the present disclosure.

The present disclosure relates to a worksite management system 200 (see FIG. 2) that is deployed at the worksite control facility 110 and will be explained in detail in connection with subsequent figures. Based on the requirements, the worksite control facility 110 may either be located at the worksite 100 or at a remote location. Referring to FIG. 2, the worksite management system 200 associated with the worksite 100 is illustrated. The worksite management system 200 includes a worksite data analytics module 202. The worksite data analytics module 202 is communicably coupled to a position sensor 204 located on-board each of the machines 102. In one embodiment, the position sensor 204 includes a Global Positioning System (GPS) configured to generate a signal indicative of an active or absolute location of the machine 102 on the worksite 100. The position of the machine 102 received by the worksite data analytics module 202 includes X-axis, Y-axis, and Z-axis co-ordinates of the machine 102 at the worksite 100.

More specifically, the worksite data analytics module 202 may receive signals at pre-defined time periods and/or infinitesimal time periods such that the worksite data analytics module 202 may be capable of continuously tracking the position of the machine 102 along the route 104 on the worksite 100. In other embodiment, signals from other sensors or modules on the machine 102 may be used to track the position of the machine 102 on the worksite 100. In an embodiment, the worksite data analytics module 202 may receive a signal indicative of the position of the machine 102 after pre-defined time intervals for tracking the position of the machine 102 on the worksite 100.

Figure 3:
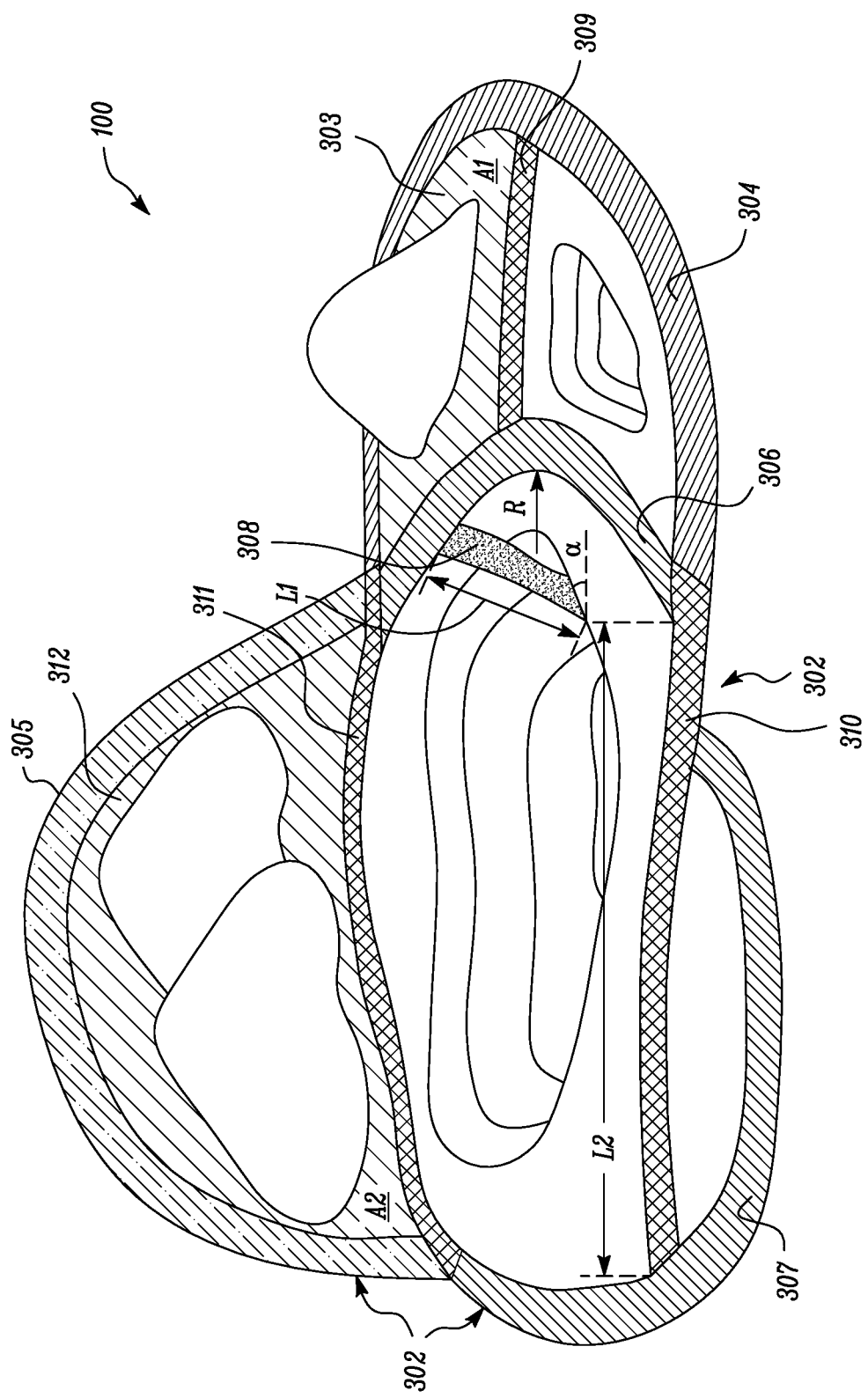
FIG. 3 is a schematic view of a segmented route of the worksite of FIG. 1, according to one embodiment of the present disclosure.

Referring to FIG. 3, the worksite data analytics module 202 is further configured to segment the route 104 into two or more topographic segments 302 based on the tracked position of the machine 102. More particularly, by analyzing the X-axis, Y-axis, and Z-axis coordinates of the machine 102 along the route 104, the worksite data analytics module 202 segments the route 104 into the various topographical segments 302. The various topographical segments 302 of the worksite 100 include, but are not limited to, a load segment 303, curve segments 304, 305, 306, 307, a ramp segment 308, flat segments 309, 310, 311, and a dump segment 312. The segmented route 104 shown in the accompanying figures is merely on an illustrative basis. A person of ordinary skill in the art will appreciate that the topographical segments 302 described herein are exemplary and may vary based on the topography of the worksite 100. Further, the worksite data analytics module 202 may segment the route 104 into any combination of the above described segments based on the topography of the worksite 100.

For the purpose of this disclosure, the load segment 303 refers to an area on the worksite 100 at which a payload is loaded onto the machine 102. The curve segment 304, 305, 306, 307 refers to a segment having a radius of curvature 'R' along the route 104. The ramp segment 308 refers to a segment having a grade/elevation or varying elevations along the route 104. The flat segment 309, 310, 311 refers to a segment having a substantially zero elevation. The dump segment 312 refers to an area at which the payload is unloaded from the machine 102. As explained earlier, the worksite 100 may include additional or other segments based on the topography of the worksite 100.

Referring to FIGS. 2 and 3, the worksite data analytics module 202 may optionally be coupled to a payload sensor 206 on-board the machine 102. The payload sensor 206 may generate a signal indicative of the payload carried by the machine 102. The worksite data analytics module 202 may utilize signals from the payload sensor 206 to segment the route 104 into the load and/or dump segments 303, 312. At the load segment 303, the worksite data analytics module 202 may identify a sudden increase or full capacity of the payload on the machine 102. Accordingly, the worksite data analytics module 202 may segment the route 104 into the load segment 303 based on signals received from the position sensor 204 and the payload sensor 206. Further, at the dump segment 312, the worksite data analytics module 202 may identify a sudden decrease or no payload on the machine 102. Thus, the worksite data analytics module 202 may segment the route 104 into the dump segment 312 on the worksite 100 based on the signals received from the position sensor 204 and the payload sensor 206. Alternatively, the worksite data analytics module 202 may segment the route 104 into the load and/or dump segments 303, 312 based on other operational parameters associated with the machine 102, such as position of an implement of the machine 102, parking status of the machine 102, gear setting of the machine 102, and so on.

Further, the worksite data analytics module 202 may segment the route 104 into the curve segment 304, 305, 306, 307 and/or the ramp segment 308 based on the signals received from the position sensor 204. Alternatively, the worksite data analytics module 202 may segment the route 104 into the curve segment 304, 305, 306, 307 and/or the ramp segment 308 based on the position of the machine 102 as well as change in a heading of the machine 102 and/or the speed of traversal of the machine 102. The worksite data analytics module 202 also segments the route 104 into the flat segment 309, 310, 311 based on the position of the machine 102. In other embodiments, in addition to the position of the machine 102, the worksite data analytics module 202 segments the route 104 into the flat segment 309, 310, 311 based on a constant speed of the machine 102, a constant acceleration or deceleration of the machine 102 on the worksite 100. In the accompanying figures, the worksite data analytics module 202 has segmented the route 104 into the load segment 303, the curve segment 304, 305, 306, 307, the ramp segment 308, the flat segment 309, 310, 311, and the dump segment 312. The shading and representation in the accompanying figures is exemplary and merely for the purpose of explanation.

Additionally or optionally, the worksite data analytics module 202 may be communicably coupled to a database 208 to send and retrieve pre-stored data therefrom. The database 208 may include any known data storage device and may be located on or off the worksite 100. The data may include pre-defined information associated with the worksite 100 and/or one or more operations to be performed by the machine 102. The pre-defined information may include the loading and/or dumping areas 106, 108 designated to the machine 102, route information for the machine 102, list of operations to be performed by the machine 102 corresponding to different locations at the worksite 100, and so on.

The worksite data analytics module 202 may also receive data related to an identification associated with the operator of the machine 102. The identification may be a unique code or radio frequency identification (RFID) tag associated with the operator. The machine 102 may include a suitable reader or input device to receive this identification information from the operator for every machine cycle and the machine 102 may subsequently transmit this information to the worksite data analytics module 202. A person of ordinary skill in the art will appreciate that the inputs for segmenting the route 104 on the worksite 100 into the segments 302 may vary based on the application and is not limited to that described herein. Additionally, the worksite data analytics module 202 may combine inputs from one or more sensors or modules to segment the route 104 on the worksite 100.

The worksite data analytics module 202 is further configured to determine one or more metrics associated with each of the segments 302 on the worksite 100. In one embodiment, the determination of the metrics associated with the segments 302 is based on the position coordinates of the machine 102. In other embodiments, the determination of the metrics is based on the position coordinates of the machine 102 and a quantity of the payload on the machine 102. In some other embodiments, the determination of the metrics is based on the position of the machine 102 combined with other sensory data associated with the machine 102.

In case of the load segment 303 and the dump segment 312, the worksite data analytics module 202 determines an area A1 associated with the load segment 303 and an area A2 associated with the dump segment 312. In case of the curve segments 304, 305, 306, 307, the metric may include a radius of curvature, a grade, and a super elevation of the curved segment 304, 305, 306, 307. In the accompanying figures, the radius of curvature is depicted by "R". In case of the ramp segment 308, the metric may include a grade and a length of the ramp segment 308. In the accompanying figures, the length of the ramp segment 308 is depicted as "L1". In case of the flat segment 309, 310, 311, the metric is a length of the flat segment 309, 310, 311. In the accompanying figures, the length of the flat segment 309, 310, 311 is depicted as "L2". As explained earlier, the metrics illustrated in the accompanying figures are exemplary. The worksite data analytics module 202 may determine other metrics based on the requirements and topography of the worksite 100.

A person of ordinary skill in the art will appreciate that the segmentation of the route 104 and/or determination of the metrics associated with the topographical segments 302 by the worksite data analytics module 202 may take place over multiple machine and/or operator cycles. Data collected and analyzed over the multiple machine and operator cycles may render a relatively accurate estimation of the segments 302 and the metrics associated therewith, thereby accounting for any changes that may take place on the topography of the worksite 100 over the numerous machine cycles.

Further, the worksite data analytics module 202 is configured to receive the one or more operational parameters associated with the machine 102 from one or more operational parameter sensors 210 on-board the machine 102. These operational parameters may include the speed, the direction of traversal, throttle position, the quantity of payload, and so on. Accordingly, the operational parameter sensor 210 may either be a single sensor or a group of sensors for providing the desired parameter signal. In one embodiment, the operational parameter sensor 210 is an on-board controller or electronic control module of the machine 102. In another embodiment, the operational parameter sensor 210 may include any other module on-board the machine 102. Further, the operational parameter sensor 210 may directly generate the signals indicative of various parameters of the machine 102. Alternatively, the parameter signal may be derived from two or more computed or estimated signals.

Based on the segmented route 104, the metrics associated with the segmented route 104 and the operational parameters associated with the machine 102, the worksite data analytics module 202 may generate one or more feedback associated with a method of operation of the machine 102. In one example, the feedback may be specific to the operator of the machine 102, such that based on the feedback the operator may change his method of operating the machine 102 to improve machine performance, productivity and/or efficiency.

In one embodiment, based on the segmentation of the route 104 and determination of the metrics associated with the segments 302, the worksite data analytics module 202 may be configured to cluster analyze information associated with the worksite 100 to identify specific regions of interest. For example, these regions of interest may include areas where a sudden change in speed of the machine 102 is required, such as, near the obstructions, while moving from the flat segments 309, 310, 311 to any of the curve segments 304, 305, 306, 307, while going on the ramp segment 308, moving back from the dump segment 312, and so on. The worksite data analytics module 202 may then monitor the operational parameters of the machine 102 which are indicative of the method of operation of the operator specifically in these regions of interest in order to ascertain if the operator is operating the machine 102 in an optimal way.

The worksite data analytics module 202 may then compare the operational parameters of the machine 102 with pre-stored parameters based on the segmented route 104 to provide a feedback to the operator. The feedback may be provided to the operator on the real time basis. In order to provide this feedback based on operator identification, on the basis of the segmented route 104 and the metrics associated with the segmented route 104, the worksite data analytics module 202 may combine relevant information from the segmented route 104, the determined metrics, the identification associated with the operator and/or the operational parameters associated with the machine 102 in order to derive the feedback.

For example, based on a past operating history of the operator and the data based on the segmented route, the worksite data analytics module 202 may send control signals for display messages to appear on a display panel within the machine 102 to instruct the operator of how to modify the speed of the machine 102 to traverse a sharp upcoming bend in the route 104 of the machine 102. Accordingly, the operator may take the necessary steps outlined in the feedback to optimally handle the machine 102 on the given route 104 or upcoming segment 302. In one example, the feedback may include alert messages displayed on the output device (such as a machine display) on-board the machine 102 indicating that the machine 102 may need to slow down while approaching the ramp segment 308 on the route 104.

Alternatively, the feedback may be provided to the operator at the end of each operation cycle. For example, the worksite data analytics module 202 may compare the operational parameters of the machine 102 along segmented route 104. The worksite data analytics module 202 may then correlate the operational parameters with pre-stored optimal parameters based on the metrics associated with the segmented route 104. After each cycle, the operator may then receive the feedback from the worksite data analytics module 202 on the comparison between how the operator handled an operation of machine 102 against an optimal operation of the machine 102.

Referring again to FIG. 2, the worksite data analytics module 202 may generate reports 212 to provide the feedback to the operator. The reports 212 may contain information related to the performance of the operator based on combining and analyzing geo-spatial information related to the worksite 100 and operations performed by the machine 102. Additionally or optionally, the reports 212 may contain information related to a suggested operational parameter of the machine 102 along the route 104. For example, based on the history of the operator and/or the geo-spatial information related to the worksite 100, the suggested operational parameter may give the operator an indication of a better, expected or optimal method of operating the machine 102. Accordingly, the generated feedback may assist the operator of the machine 102 in improving his performance for future cycles on the segmented route 104. In one embodiment, the worksite data analytics module 202 may also provide the reports 212 to a mine operator on suggested changes that can be done in a layout or design of the worksite 100. For example, the reports may include the changes required in certain topographical segments 302 for providing a better efficiency and/or productivity of the machines 102, or providing an alert to the mine operator about certain obstacles in the route 104 of machine 102 and so on.

Figure 4:
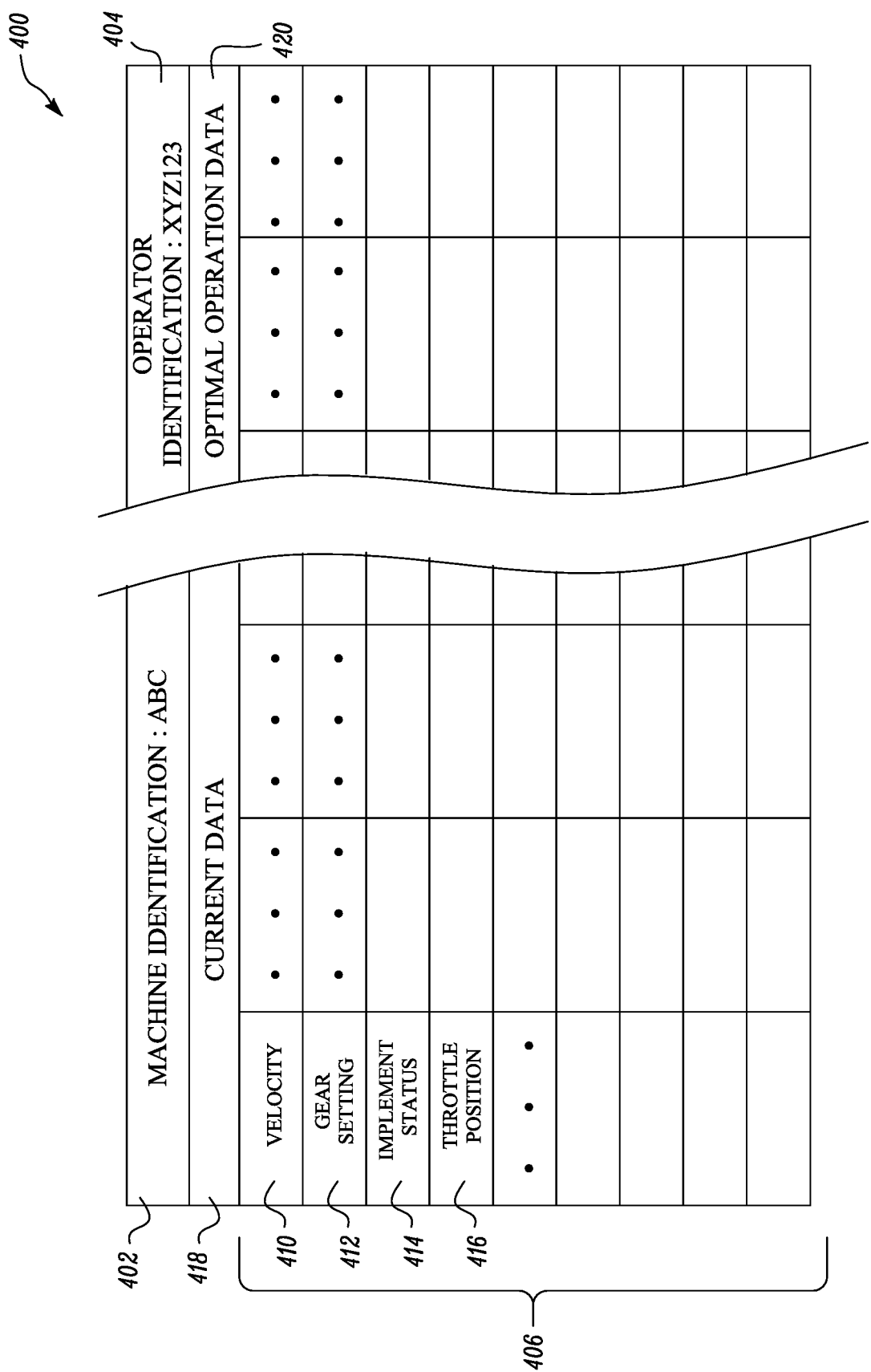
FIG. 4 is a schematic of an exemplary feedback report generated by the worksite management system, according to one embodiment of the present disclosure.

FIG. 4 is an exemplary report 400 generated by the worksite data analytics module 202. For the machine 102 having a machine identification 402 and an operator identification 404, the system provides the report 400 such that the report 400 is displayed on a display panel in an operator cab of the machine 102 or handed over in a physical form. The report 400 includes a number of the operational parameters 406, such as velocity of the machine 410, gear setting 412, implement status 414, throttle position 416, and so on. Further, the report 400 includes information related to current data 418 corresponding to each of the operational parameters 406 pertaining to the given area of interest on the segmented route 104.

Based on the combined and analyzed data, the worksite data analytics module 202 also provides optimal operation data 420 for each of the operational parameters 406 according to the operator performance and the segmented route 104. Hence, through the report 400 the operator may be made aware of how to change his method of operating the machine 102 so that the performance of the machine 102 may improve. A person of ordinary skill in the art will appreciate that the given report 400 is merely exemplary and does not limit the scope of the present disclosure.

Figure 5:
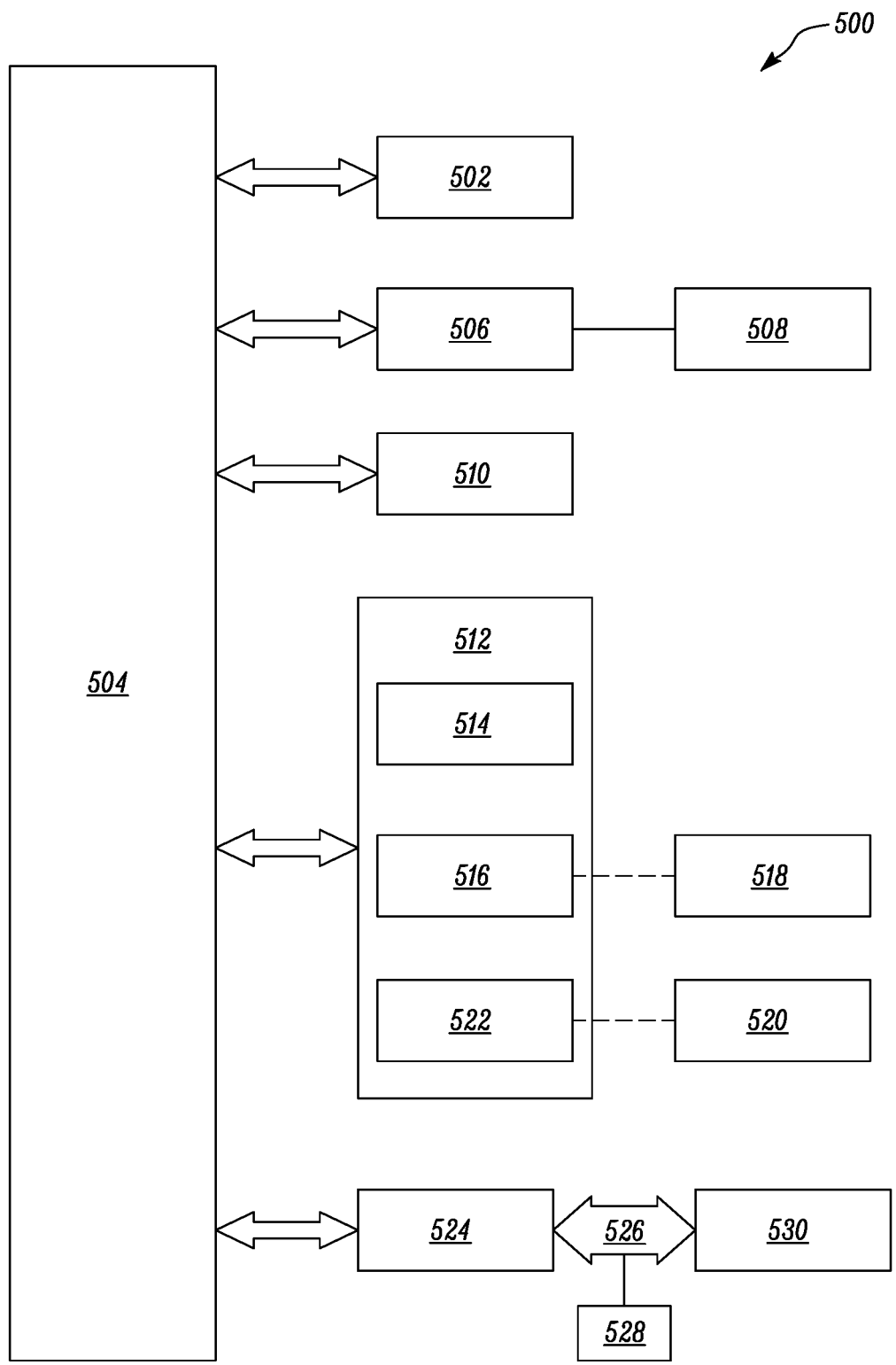
FIG. 5 is a schematic of a low-level implementation of a computer-based system that can be configured to perform functions of the worksite management system, according to one embodiment of the present disclosure.

FIG. 5 is an exemplary low-level implementation of the worksite data management system 200 of FIG. 2 for management of the worksite 100. The present disclosure has been described herein in terms of functional block components, modules, and various processing steps. It should be appreciated that such functional blocks may be realized by any number of hardware and/or software components configured to perform the specified functions. For example, a computer based system, hereinafter referred as system 500 may employ various integrated circuit components, e.g., memory elements, processing elements, logic elements, look-up tables, and/or the like, which may carry out a variety of functions under the control of one or more microprocessors or other control devices. Similarly, the software elements of the system 500 may be implemented with any programming or scripting language such as, but not limited to, C, C++, Java, COBOL, assembler, PERL, Visual Basic, SQL Stored Procedures, extensible markup language (XML), with the various algorithms being implemented with any combination of data structures, objects, processes, routines or other programming elements.

Further, it should be noted that the system 500 may employ any number of conventional techniques for data transmission, signaling, data processing, network control, and/or the like. Still further, the system 500 could be configured to detect or prevent security issues with a user-side scripting language, such as JavaScript, VBScript or the like. In an embodiment of the present disclosure, the networking architecture between components of the system 500 may be implemented by way of a client-server architecture. In an additional embodiment of this disclosure, the client-server architecture may be built on a customizable.Net (dot-Net) platform. However, it may be apparent to a person ordinarily skilled in the art that various other software frameworks may be utilized to build the client-server architecture between components of the system 500 without departing from the spirit and scope of the disclosure.

These software elements may be loaded onto a general purpose computer, special purpose computer, or other programmable data processing apparatus to produce a machine, such that the instructions that execute on the computer or other programmable data processing apparatus create means for implementing the functions disclosed herein. These computer program instructions may also be stored in a computer-readable memory that can direct a computer or other programmable data processing apparatus to function in a particular manner, such that the instructions stored in the computer-readable memory produce instructions which implement the functions disclosed herein. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions disclosed herein.

The present disclosure (i.e., system 200, system 500, method 600, any part(s) or function(s) thereof) may be implemented using hardware, software or a combination thereof, and may be implemented in one or more computer systems or other processing systems. However, the manipulations performed by the present disclosure were often referred to in terms such as detecting, determining, and the like, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices. In accordance with an embodiment of the present disclosure, the present disclosure is directed towards one or more computer systems capable of carrying out the functionality described herein. An example of the computer based system includes the system 500, which is shown by way of a block diagram in FIG. 5.

The system 500 includes at least one processor, such as a processor 502. The processor 502 may be connected to a communication infrastructure 504, for example, a communications bus, a cross-over bar, a network, and the like. Various software embodiments are described in terms of this exemplary system 500. Upon perusal of the present description, it will become apparent to a person skilled in the relevant art(s) how to implement the present disclosure using other computer systems and/or architectures. The system 500 includes a display interface 506 that forwards graphics, text, and other data from the communication infrastructure 504 for display on a display unit 508.

The system 500 further includes a main memory 510, such as random access memory (RAM), and may also include a secondary memory 512. The secondary memory 512 may further include, for example, a hard disk drive 514 and/or a removable storage drive 516, representing a floppy disk drive, a magnetic tape drive, an optical disk drive, etc. Removable storage drive 516 reads from and/or writes to a removable storage unit 518 in a well-known manner. The removable storage unit 518 may represent a floppy disk, magnetic tape or an optical disk, and may be read by and written to by the removable storage drive 516. As will be appreciated, the removable storage unit 518 includes a computer usable storage medium having stored therein, computer software and/or data.

In accordance with various embodiments of the present disclosure, the secondary memory 512 may include other similar devices for allowing computer programs or other instructions to be loaded into the system 500. Such devices may include, for example, a removable storage unit 520, and an interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 520 to system 500.

The system 500 may further include a communication interface 524. The communication interface 524 allows software and data to be transferred between the system 500 and external devices 530. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 may be in the form of a plurality of signals, hereinafter referred to as signals 526, which may be electronic, electromagnetic, optical or other signals capable of being received by the communication interface 524. The signals 526 may be provided to the communication interface 524 via a communication path (e.g., channel) 528. The communication path 528 carries the signals 526 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 516, a hard disk installed in the hard disk drive 514, the signals 526, and the like. These computer program products provide software to the system 500. The present disclosure is also directed to such computer program products.

The computer programs (also referred to as computer control logic) may be stored in the main memory 510 and/or the secondary memory 512. The computer programs may also be received via the communication interface 504. Such computer programs, when executed, enable the system 500 to perform the functions consistent with the present disclosure, as discussed herein. In particular, the computer programs, when executed, enable the processor 502 to perform the features of the present disclosure. Accordingly, such computer programs represent controllers of the system 500.

In accordance with an embodiment of the present disclosure, where the disclosure is implemented using a software, the software may be stored in a computer program product and loaded into the system 500 using the removable storage drive 516, the hard disk drive 514 or the communication interface 524. The control logic (software), when executed by the processor 502, causes the processor 502 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s). In yet another embodiment, the present disclosure is implemented using a combination of both the hardware and the software.

Various embodiments disclosed herein are to be taken in the illustrative and explanatory sense, and should in no way be construed as limiting of the present disclosure. All numerical terms, such as, but not limited to, "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 6:
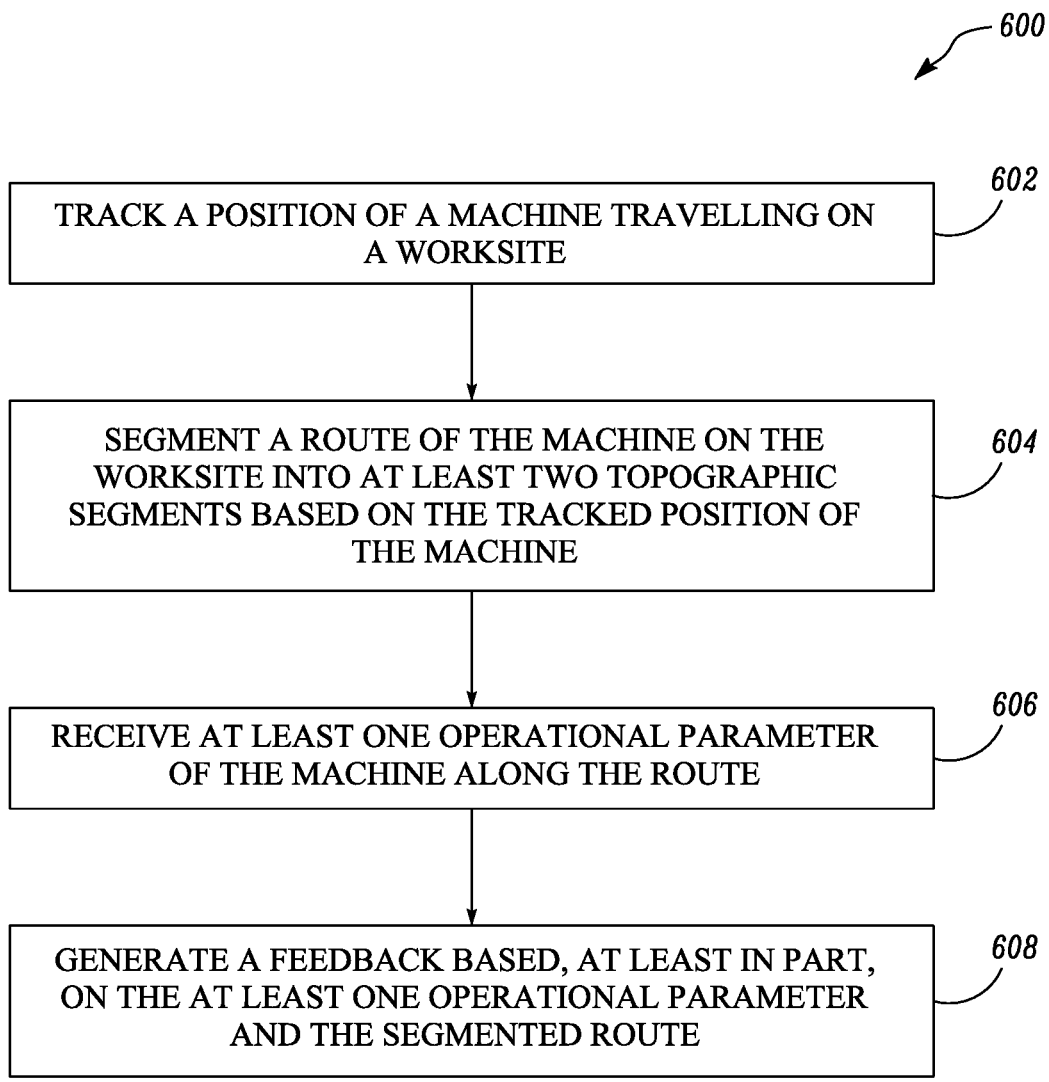
FIG. 6 is a flowchart of a method of operation of the worksite management system, according to one embodiment of the present disclosure.

The present disclosure relates to the system for worksite data management. Referring to FIG. 6, the method 600 of operation of the worksite data management system 200 is illustrated. At step 602, the worksite data analytics module 202 tracks the position of the machine 102 travelling on the worksite 100. At step 604, the worksite data analytics module 202 segments the route 104 of the machine 102 on the worksite 100 into two or more topographic segments 302 based on the tracked position of the machine 102. At step 606, the worksite data analytics module 202 receives the one or more operational parameters of the machine 102 along the route 104. At step 608, the worksite data analytics module 202 generates the feedback based on the operational parameters of the machine 102 and the segmented route.

The worksite data management system 200 may dynamically monitor changes on the worksite 100 by combining and analyzing data from various data streams indicative of positions of the machines 102, velocities of the machines 102, machine cycle related information and/or operator related information. The worksite data management system 200 may then segment the route 104 of the machine 102 into the segments 302 and determine the metrics corresponding to the segments 302. Further, by analyzing and comparing the desired metrics with the operational parameters associated with the machine 102, the worksite data management system 200 may be able to compare the performance of the operator with the optimal or expected performance on all areas or selective areas of the segmented route. Accordingly, the worksite data management system 200 may provide relevant coaching tips through the feedback and the generated reports 212 so that the operator may change or improve his method of operating the machine 102 based on the segments 302 along the route 104. In one example, the worksite data management system 200 may identify severe operations performed by the operator and provide the feedback so that the operator may take corrective steps to better his performance.

The system and the method described herein may provide a smart and effective solution that positively impacts optimal planning of the worksite 100, and operator training. Further, the feedback provided by the system may be used to enforce speed limits on the curve and ramp segments 306, 308 based on the determined metrics associated therewith. Accordingly, by providing relevant coaching tips to the operator, the system may reduce or prevent damage to components of the system. For example, based on the feedback, tire wear, frame racking, brake overheating may be reduced or avoided. In another example, the operator may receive alerts of impending machine tipping which may allow the operator to change his method of operating the machine 102. Hence, productivity may be increased and costs may be decreased by implementing the system and method described herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for improving performance of a machine on a worksite, the method comprising:
   tracking, via a position sensor, a position of the machine travelling on the worksite and at least partially controlled by an operator;
   segmenting, via a processor, a route of the machine on the worksite into at least two topographic segments based on the tracked position of the machine;
   identifying, via the processor, the operator of the machine;
   receiving, via a parameter sensor, at least one operational parameter of the machine while the machine is travelling along the route; and
   after said segmenting, on a subsequent cycle of the machine while the machine is traveling along the route under the at least partial control by the identified operator, sending, to the machine, in real time, and based, at least in part, on the at least one operational parameter, the segmented route, and the identified operator, control signals associated with instructions for changing a speed of the machine in real time while the machine is traveling along the route during the subsequent cycle and before the machine traverses an upcoming portion of the route during the subsequent cycle,
   wherein the machine is an autonomous machine,
   wherein said segmenting the route is based on at least one prior traversal of the route by the machine and one or more additional machines, wherein the control signals are generated based on at least one of pre-defined information associated with the worksite or one or more operations performed by the machine, and wherein the instructions for changing the speed of the machine are specific to the identified operator of the machine and the upcoming portion of the route during the subsequent cycle as the machine travels along the route.

2. The method of claim 1, further comprising determining a metric corresponding to each of the at least two topographic segments based on the tracked position of the machine.

3. The method of claim 2,
wherein one of the at least two topographic segments is a curve segment, and
wherein the metric includes information regarding at least one of a curvature, a super-elevation, or a grade corresponding to the curve segment.

4. The method of claim 2,
wherein one of the at least two topographic segments is a flat segment, and
wherein the metric includes information regarding a length corresponding to the flat segment.

5. The method of claim 2,
wherein one of the at least two topographic segments is a ramp segment, and
wherein the metric includes information regarding at least one of a length or a grade corresponding to the ramp segment.

6. The method of claim 2,
wherein the at least two topographic segments include at least one of a load segment or a dump segment, and
wherein the metric includes information regarding an area of the load segment or the dump segment.

7. The method of claim 1, wherein the control signals include information regarding a suggested optimal operational parameter associated with the machine along the route.

8. The method of claim 1, wherein the control signals include information regarding a suggested change in a layout and design of the worksite.

9. The method of claim 1, wherein, based on the control signals, the machine modifies one or more operational parameters of the machine.

10. The method according to claim 1, further comprising determining, using the processor, one or more specific regions of interest adjacent the route of the machine by clustering analyzed information associated with the worksite,
wherein said sending the control signals to the machine with the instructions for changing the speed of the machine is based on a speed associated with the route and one of the determined one or more specific regions of interest.

11. A system for improving performance of a machine on a worksite, the system comprising:
a position sensor located on-board the machine;
a parameter sensor located on-board the machine;
wherein the parameter sensor is configured to provide a signal indicative of a plurality of operational parameters of the machine;
a processing device communicably coupled to the position sensor and the parameter sensor, wherein the processing device, which is offboard the machine, is configured to:
track a position of the machine travelling on the worksite;
segment a route of the machine on the worksite into at least two topographic segments based on the position of the machine;
identify at least one operational parameter of the plurality of operational parameters of the machine;
determine one or more specific regions of interest adjacent the route of the machine by clustering analyzed information associated with the worksite based on position and operational parameter data received from the machine and a plurality of additional machines at the worksite each having previously traversed said route, the operational parameter data including speed data for each of the machine and the plurality of additional machines regarding traversal of said route;
as the machine is traversing said route, send, to the machine and based on the at least one operational parameter, the segmented route, and one of the determined one or more specific regions of interest, control signals associated with instructions for changing a speed before traversing an upcoming portion of the route associated with said one of the determined one or more specific regions of interest; and
modifying, based on the control signals, one or more operational parameters of the machine to traverse the upcoming portion of the route according to one or more predetermined criterions specific to the upcoming portion of the route set based on the previous traversals of said route by the machine and the plurality of additional machines,
wherein the machine is an autonomous machine, and
wherein the sending of the control signals to the machine with the instructions for changing the speed of the machine is based on a speed associated with the upcoming portion of the route and said one of the determined one or more specific regions of interest.

12. The system of claim 11, wherein the processing device is further configured to determine a metric corresponding to each of the at least two topographic segments based on the position of the machine.

13. The system of claim 12,
wherein one of the at least two topographic segments is a curve segment, and
wherein the metric includes information regarding at least one of a curvature, a super-elevation, or a grade corresponding to the curve segment.

14. The system of claim 12,
wherein one of the at least two topographic segments is a flat segment, and
wherein the metric includes information regarding a length corresponding to the flat segment.

15. The system of claim 12,
wherein one of the at least two topographic segments is a ramp segment, and
wherein the metric includes information regarding at least one of a length or a grade corresponding to the ramp segment.

16. The system of claim 12,
wherein the at least two topographic segments include at least one of a load segment or a dump segment, and
wherein the metric includes information regarding an area of the load segment or the dump segment.

17. A non-transitory computer readable medium comprising instructions, the instructions comprising:
one or more instructions that, when executed by at least one processor, cause the at least one processor to:
track, via a position sensor, a position of a machine travelling on a worksite;

identify a current operator of the machine;

receive at least one operational parameter of the machine; and in a subsequent cycle of the machine after a route of the machine has been segmented into at least two topographic segments based on the position of the machine, send, to the machine and based on the at least one operational parameter, the segmented route, and at least one of one or more specific regions of interest adjacent the route of the machine determined by clustering analyzed information associated with the worksite, control signals associated with instructions for changing a speed of the machine before traversing an upcoming portion of the route during the subsequent cycle of the machine traversing the route, wherein the sending of the control signals to the machine with the instructions for changing the speed of the machine is based on a speed associated with the route and one of the determined one or more specific regions of interest, wherein the instructions for changing the speed of the machine are specific to the identified operator of the machine and the upcoming portion of the route during the subsequent cycle as the machine travels along the route.

18. The non-transitory computer-readable medium of claim 17, wherein the instructions further comprise:

one or more instructions to determine a metric corresponding to each of the at least two topographic segments based on the position of the machine.

19. The non-transitory computer-readable medium of claim 17, wherein the upcoming portion is a curve segment or a ramp segment, and wherein the control signals enforce a speed limit.

* * * * *